[11] 3,572,896

[72] Inventor S
Los Angeles, Calif.
[21] Appl. No. 648,781
[22] Filed June 26, 1967
[45] Patented Mar. 30, 1971
[73] Assignee The Bunker-Ramo Corporation
Canoga Park, Calif.

[54] SWITCHABLE LIGHT MODULATING DEVICE
9 Claims, 10 Drawing Figs.
[52] U.S. Cl.................................................. 350/160,
350/267, 350/269, 350/286, 350/290, 350/312,
350/315, 356/201
[51] Int. Cl........................................................ G02f 1/28
[50] Field of Search........................................... 350/267,
269, 290, 315; 356/201; 350/286; 350/160

References Cited
UNITED STATES PATENTS
3,200,525   8/1965   Francis........................... 40/130

*Primary Examiner*—Ronald L. Wibert
*Assistant Examiner*—Paul K. Godwin, Jr.
*Attorney*—Frederick M. Arbuckle ABSTRACT: A controllable light reflective device made up of a chamber having at least a portion of its walls transparent to form a window therein with a light reflective structure forming part of or associated with said window. A fluid is placed in the chamber with structure for controllably displacing the fluid to and from a selected portion of the chamber and in optical cooperation with the reflective structure so as to control the amount of incident light which is reflected by the device through the window.

PATENTED MAR 30 1971  3,572,896
SHEET 1 OF 2
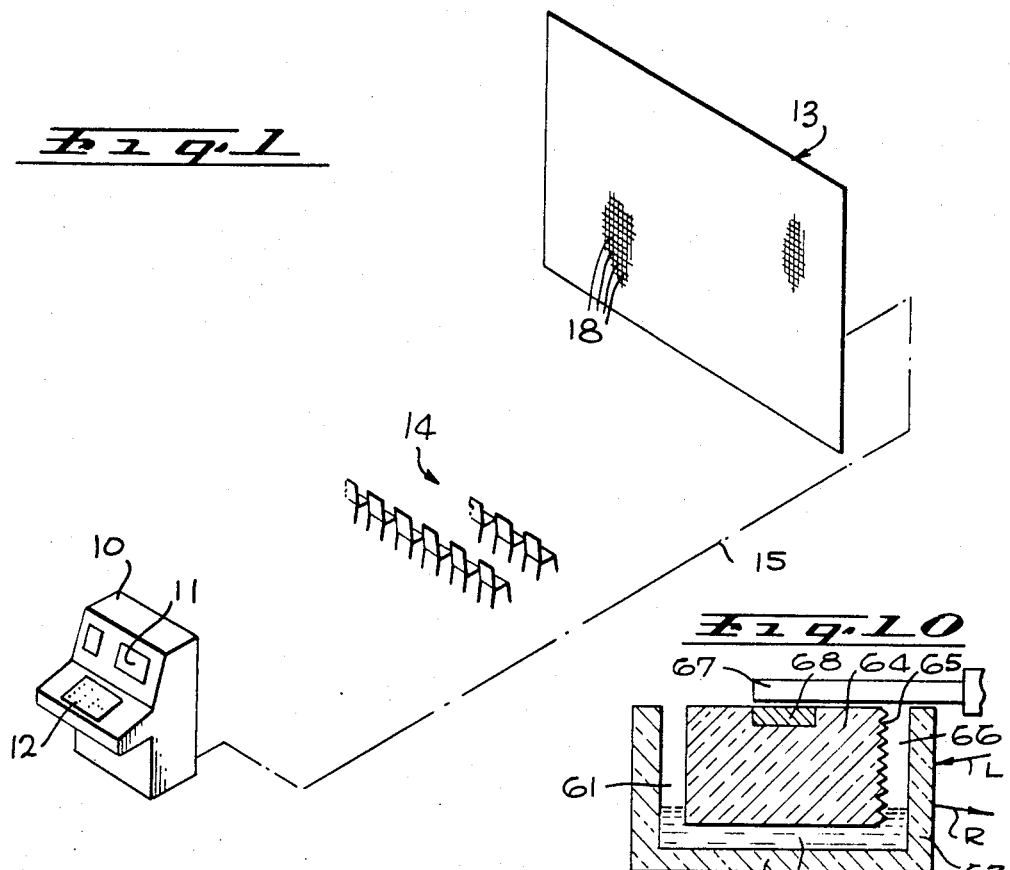
Fig. 1
Fig. 10
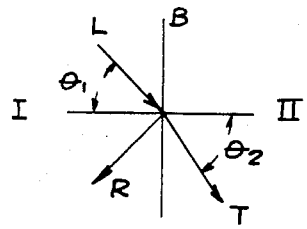
Fig. 2
Fig. 9
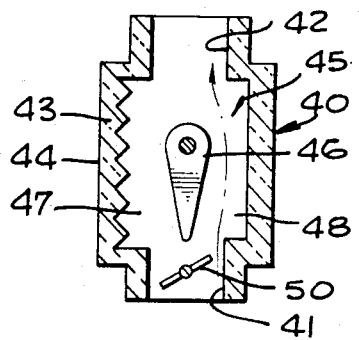
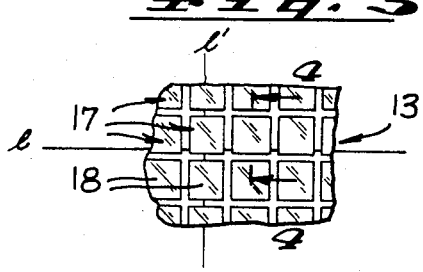
Fig. 3
INVENTOR.
SIDNEY BERTRAM
BY Roger A. Marrs INVENTOR.
SIDNEY BERTRAM
BY Roger A. Marrs

3,572,896

SWITCHABLE LIGHT MODULATING DEVICE

BACKGROUND OF THE INVENTION

1. Field of the Invention

This invention relates to light modulators and, more particularly, to a novel light ray reflector device wherein the magnitude of reflected light can be readily affected by externally and remotely applied switching stimuli.

2. Description of the Prior Art

There have been many diverse attempts directed toward the solution of the problem of effective presentation of data provided as an output from a digital computer. The computer is capable of performing high speed operations of a very complex nature that are not directly meaningful to a human observer. However, the final result of the computer data processing must, in many cases, be matched to the physiological, emotional, and intellectual capabilities of the human decision maker. This is particularly true of the command and control environment associated with most of the present and planned military and space systems control center operations.

Although an initial consideration of the display problem may indicate a trivial solution, a detailed examination of the requirement demonstrates the high order of complexity associated with the various parameters. As a single example, the problem of pictorially providing a high-quality, updated map in full color in quasireal time (within one second from the initiation of a request) on a large viewing screen of wall type with adequate resolution, brightness and accuracy are beyond the present state of the art. Modern display systems utilizing most or all of the following technologies have been described: cathode ray tubes, transistor circuits, mechanics and electromechanics, optical arrangements in the visible, infrared, and ultraviolet regions, film exposure with wet and dry processing, heat flow, digital interface, human factors, fluid dynamics, and solid state physics.

In the display field today, many different techniques in use or in the process of development have the same system objective. In general, computer consoles are dependent upon cathode ray tube techniques and group displays, such as is represented by large viewing screens, or upon projection optics. A typical system may, however, require the use of both wherein the console serves as an individual input-output device to instruct or request operations on the part of the computer and wherein the large viewing display provides the results of these and other requests for programs to a group audience. The significant techniques that have been used or are available for computer-console-driven group display systems can be placed into the following categories: (1.) film generation and projection systems; (2.) electromechanically driven systems; (3.) projection cathode ray tube systems; (4.) Schlieren projection systems; (5.) electrostatic systems; (6.) photochromatic systems; and (7.) electroluminescent materials.

None of these display systems satisfies the total requirement. For example, there are no major large screen computer oriented systems incorporating film generation and projection systems that utilize a wet processing method. The reasons for this have been the high heat absorption in the film gate, the necessity for drying the film prior to projection, and the lack of stability of the film base material. The use of electromechanical elements in the display generation cycle of a system implies that a tradeoff has been effected between the slower response characteristics of the moving elements and the freedom of film handling and processing. In addition, the use of accurate discrete elements theoretically provides the possibility of very high accuracy and location of track data, although this has proved difficult to meet in practice.

With regard to Schlieren display systems, the problems with the use of this equipment are associated with the passage of the film in and out of a vacuum chamber, the cooling of the film in the vacuum chamber, and the scratching of the film surface during transport. In electrostatic display systems, the associated problems are temperature sensitivity, toner contamination, storage and retrieval. The display must either be projected directly from the toner dusted plate or be transferred to a film or paper base with attendant loss of response time and resolution. Although photochromatic systems are characterized by high resolution erasure and rewrite capacity, with no attendant processing, the disadvantages are the necessity of high light intensity for exposure and the wear of the photochromatic materials after about 1,000 reversals.

In regard to electroluminescence (EL) materials, the EL material or phosphor emits visible radiation from the excitation of an electric field outside of a vacuum environment. The EL light display output is produced by sandwiching a thin film of EL material between two conductors, one of which must be transparent. The film in this elemental configuration is a few mils thick and requires excitation in the order of 200—800 volts. The light display output increases approximately proportionately to the square of the voltage difference and the square root of the frequency difference. These characteristics, however, are interrelated and vary with different phosphor combinations. The usual frequency range is in the 400 to 5,000 Hz range, and the driving voltages are limited by breakdown potential considerations and frequency by the capacitance of the film structure as well as leakage excitation. The key problem area for the application of the EL material to a display system is in the storage and switching of the information. Alphanumeric or track data are provided through the selective actuation of segmented portions of a 14 element matrix for each symbol. 2,000 symbols would, therefore, require 28,000 bit switching. A large wall display with vector as well as alphanumerics would require about 25 bits per inch for effective resolution. This, in turn indicates a total storage and switching problem in the 6,000,000 bit range. The addition of color change capability requiring selection of other EL phosphor granules increases the problem complexity.

SUMMARY OF THE INVENTION

The difficulties and problems encountered with visual display systems as enumerated above are obviated by the light modulating device of the present invention, which provides for a switchable light reflector cell that may be used to replace the panel lights presently being used to indicate the ON/OFF state or condition of various devices. Alternatively, many switchable light reflectors of the invention can be assembled into a mosaic wherein the individual reflector devices may be controlled by a suitable pattern or display generator so that the composite picture formed by the ensemble conveys desired information to the human observer. Therefore, the device of the present invention can be employed as an individual display unit to indicate a condition or state, and, when a plurality of devices are employed, a large wall-type viewing screen or display surface may be provided wherein the pictorial information is generated by a digital process. Therefore, the present invention is adapted for use in a wide variety of display applications, and, since the light output from the controllable reflector device is derived from outside the device, it is particularly attractive for use in high light level environments that might render other types of displays useless.

One form of the present invention is primarily based on a commonly known and well understood phenomenon, namely, that of the reflection of light in passing from a medium of high index of refraction to a medium of lower index of refraction. If the angle of incidence at the boundary or interface exceeds the "critical angle," "total reflection" occurs. If, however, the indices of refraction are nearly equal on the two sides of the interface, or in some instances where the light is made to pass from a first medium of relatively low index of refraction to a medium of relatively high index of refraction, incident light will be largely transmitted into the second medium and only a very small percentage reflected.

In general, the light modulating device embodying this form of the present invention provides a first light transparent medium having a given index of refraction and a second medium having a lower index of refraction than the first medium. A third medium having an index of refraction substantially equal to or greater than the first medium is provided, and means are included for controllably moving the second and third media immediately adjacent the first medium so as to cause light incident from the first medium to either be substantially totally reflected away from the second medium or be transmitted into the third medium.

In a more specific form of the invention, an enclosure is provided including a prism structure formed at one end thereof having a display surface adapted to be viewed by an observer with one or more wedge-configured rear surface protrusions projecting into the chamber defined by the enclosure. A displacer element is disposed in said enclosure chamber having a forward surface disposed in substantially fixed spaced-apart relationship so that a chamber space is defined immediately behind the prism and in front of the displacer element forward surface. The enclosure is suitably dimensioned to accommodate vertical movement of the displacer element with restriction of lateral movement effected by the provision of guides on the displacer element cooperating with the inner wall surfaces of the enclosure chamber. The chamber is filled in part with a fluid medium having an index of refraction substantially equal to or greater than the refractive index of the material composing the prism. When the displacer element is in its lowermost vertical position, the fluid substantially surrounds the displacer element and causes the fluid level to rise so as to substantially fill the chamber space between the prism and the displacer. Means are provided for moving the displacer element in a vertical upward direction in response to an external stimulus so that the level of the fluid in the chamber falls to an extent that the chamber space between the prism and the displacer element is substantially free of fluid and is occupied by a gas, such as air, having a lower index of refraction than either the fluid or the prism material.

By substituting the gas in the space between the prism and the displacer element for the fluid medium, incident light rays impinging on the front face of the prism will be totally reflected instead of passing into the fluid and being absorbed by the interior walls of the chamber. A marked distinction is therefore made by the observer between the two states or conditions of the device.

Another embodiment contemplated by the present invention includes the provision of a movable float or displacer element having a light reflecting surface which is partially immersed in an opaque, light absorbing fluid. Observation of the reflecting surface is provided through a light transparent window. By moving the float, the fluid can be controlled so as to selectively cover or uncover the reflecting surface. If the fluid is not interposed between the reflecting surface and transparent window, incident light will be reflected by the surface and the visual indication will be bright; however, when the fluid is interposed between the reflecting surface and the window, the visual indication will be dark.

Therefore, it can be seen that the light modulating device of the present invention may be employed to substantially totally reflect impinging light rays or may be switched to an alternate condition wherein the light rays are substantially totally absorbed. The device may be employed by itself to designate either one of two static conditions and in such use may be remotely controlled or switched if desired. Also, a plurality of devices may be incorporated into a large viewing screen where each device of the plurality may be individually switched from one condition to another by means of a computer processor so that pictorial or alphanumeric information can be presented to a viewing audience.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIG. 1 is a perspective diagrammatic view of a typical large screen display system incorporating a multiplicity of the novel switchable light modulating devices of the present invention;

FIG. 2 is a graphic illustration of light ray phenomena on which the concept of the present invention is based showing a light ray being reflected and refracted;

FIG. 3 is an enlarged fragmentary view of a portion of the large viewing screen shown in FIG. 1 and illustrating the front face of a plurality of switchable light modulating devices;

FIG. 9 is a sectional view of still another version of the present invention; and FIG. 10 is a longitudinal sectional view of another embodiment incorporating the present invention utilizing a reflecting surface and a light absorbent fluid to control the visual indication of the device.

DESCRIPTION OF THE PREFERRED EMBODIMENTS

Figure 4:
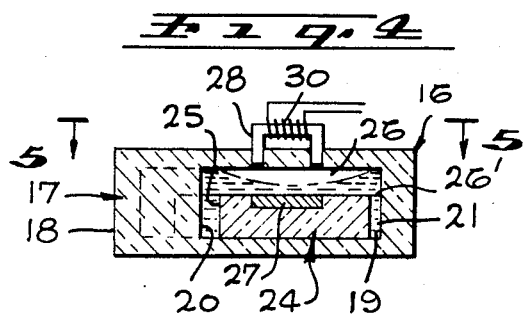
FIG. 4 is an enlarged sectional view of a light modulating device or cell as taken in the direction of arrows 4—4 of FIG. 3, with the fluid shown between the prism and displacer element so that it is in the light absorbing or dark condition.

Referring to FIG. 1, a large screen display system is illustrated which includes a computer console or processor 10 having a cathode ray tube display 11 and a keyboard input device 12 for manually entering data into the memory of the processor. Other ancillary data input equipment may be coupled to the processor 10, if desired. Remotely located from the processor is a large display screen 13 adapted to substantially cover a wall for the immediate showing and viewing of pictorial or alphanumeric information on the face thereof by an audience disposed in an area in front of the screen and as may be represented by the presence of a plurality of chairs indicated in an audience area 14. The processor 10 is connected to the screen 13 by means of a suitable cable 15 so that data information and control signals may be transmitted to the screen under the direction of the program entered into and stored in the memory of the processor.

The screen 13 incorporates a multiplicity of light modulating devices or cells in accordance with the present invention as shown in FIG. 3, which are preferably arranged in a plurality of rows and columns having the front face of each device constituting the viewing face of the screen. Desired information to be presented on the screen may be readily achieved by programming the excitation of selected devices in particular rows and columns during a predetermined time cycle so as to operate the selected devices while other nonselected devices will not be operated. In such an instance, the operated plurality of selected devices will form a composite image of the pictorial or alphanumeric information desired to be displayed to the audience.

The concept underlying one form of the present invention resides in the bending of light when it passes from one medium having a first index of refraction to another medium having a second index of refraction, which bending is referred to by those skilled in the art as refraction. Refraction of light is caused by the increase or decrease in the speed of light when it enters the new medium and the index of refraction of a material is the ratio of the speed of light in air to the speed of light in that medium. A material with a high index of refraction is said to have a "high optical density." Such a material will, of course, refract light more than a material with a lower index of refraction. Therefore, according to the laws of refraction, when a ray of light passes obliquely from one medium into another of greater optical density, the ray of light is refracted toward the normal (perpendicular). Also, conversely, when a ray of light passes obliquely from one medium into another of smaller optical density, it is refracted away from the normal.

However, if the angle of incidence of a ray of light which is bent away from the normal upon passing from one medium into another of lower optical density is increased, a condition will be found where the refracted ray just coincides with the surface between the two media. The angle of incidence at which this occurs is called the "critical angle." When a ray of light travelling in a dense medium is incident upon the surface of a less dense medium at an angle greater than the critical angle, the ray will not pass through the surface but will be completely reflected and may be said to undergo "total reflection."

The above laws of refraction are illustrated diagrammatically in FIG. 2, wherein the interface boundary B divides a first region I composed of a material having an index of refraction $n_1$ from a second region II composed of a different material having an index of refraction $n_2$, where $n_1$ is greater than $n_2$. A light ray L appearing in the first region I is incident at an angle $\Theta$ at the boundary and results in a reflected ray R, the observed ray as described herein, and a transmitted ray T. The angle of reflection is, of course, equal to the angle of incidence. The angle of the transmitted ray T is given by:

$$\sin \theta_2 = \frac{n_1}{n_2} \sin \theta_1$$

It will be noted that for $(n_1/n_2) \sin \Theta_1 > 1$, the angle of the transmitted ray T is imaginary so that the incident light is totally reflected.

If the first region I is formed by an optically transparent material such as glass or lucite $(n_1 > \sqrt{2})$ and region II is formed by the atmosphere or equivalent $(n_2=1)$, then an angle of incidence of, for example, 45°, will yield no transmitted ray, and hence substantially total reflection of the incident energy. If, however, the second region II is filled with a liquid such as water $(n=1.33)$, the critical angle will be greatly increased and so a substantial amount of the energy incident at 45° would be transmitted rather than reflected. If a liquid with an index of refraction equal to $n_1$ is used, transmission would be complete and the reflected energy cut off. The essence of one form of the present invention is the controlled movement of a suitable medium in and out of the second region II so as to switch the behavior of the cell at the interface between total reflection and, hence, a bright viewing surface and essentially total transmission with a consequent dark viewing surface.

Figure 5:
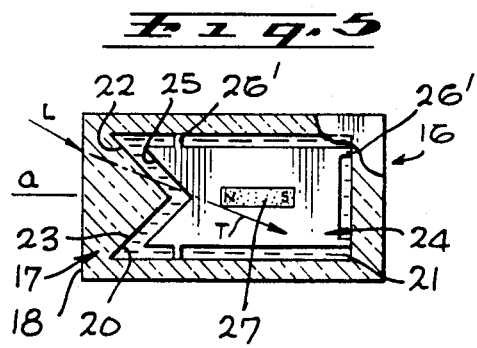
FIG. 5 is a plan view, partly in section, of the light modulating device shown in FIG. 4 as taken in the direction of arrows 5—5 thereof.

Referring now in detail to FIGS. 4 and 5, one embodiment of the present invention is shown which may be referred to as a switchable light reflector "cell" which includes an enclosure 16 having a prism 17 formed in one end thereof having a flat display surface 18 adapted to be viewed by an observer and a wedge-configured rear surface 20 projecting into a closed chamber 21. The material of the enclosure including the prism 17 may be composed of a transparent plastic such as lucite, which serves to totally reflect the incident light ray L at two faces 22 and 23 and redirect it out normal to the front face 18 when the cell is switched "ON."

A diverter or displacer element 24 is disposed in the enclosure chamber or hollow housing 21 and is formed with a forward wedge-shaped surface 25 corresponding to and adapted to receive the wedge-configured prism rear surface 20 in substantially fixed spaced-apart relationship so that a chamber gap or space is defined immediately behind the prism and in front of the displacer element forward surface. Preferably, the enclosure chamber 21 is suitably dimensioned to accommodate vertical movement of the displacer element 24 with restriction of lateral movement effected by the provision of guides 26' formed on opposite sides of the displacer element which cooperate with the inner wall surfaces of the enclosure chamber 21. The chamber 21 is partially filled with a fluid liquid medium 19, having a suitable index of refraction, which substantially surrounds the displacer element 24 except for a pocket in which a gas or gas fluid medium resides and which may take the form of an air bubble represented by numeral 26 in FIG. 4 that is normally at rest at the top of the chamber 21 between the uppermost chamber wall surface and the top (not numbered) of the displacer element 24.

Means are provided for moving the displacer element 24 within the chamber 21 which, by way of example, includes a permanent bar magnet 27 which is carried on the top of the displacer element 24 and an electromagnet 28 located on the enclosure 16 so that its pole pieces are carried thereon and terminate at a suitable distance from the bar magnet 27 when the displacer element 24 is resting on the bottom of the chamber 21. A wire 30 is coiled about the center section of the electromagnet and is employed for exciting the magnet. The permanent bar magnet 27 has a north pole N and a south pole S.

Figure 6:
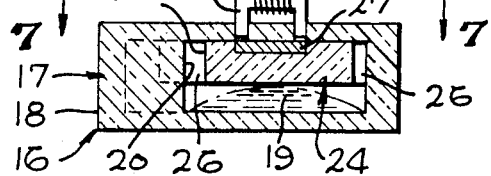
FIG. 6 is a view similar to that of FIG. 4 illustrating the light modulating device switched to its alternate condition for reflecting light rays.
Figure 7:
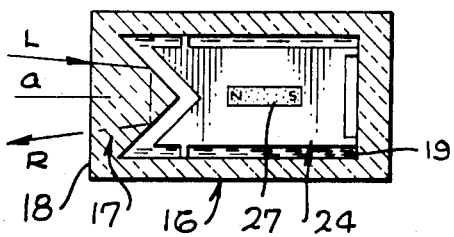
FIG. 7 is a sectional view of the light modulating device shown in FIG. 6 taken in the direction of arrows 7—7 thereof.

When the electromagnet 28 is excited by passing a current through the coil 30 so that a south pole appears above the north pole N on the magnet 27 and a north pole of the electromagnet is above the bar magnet south pole S, the displacer element 24 will be lifted vertically toward the terminating end of the pole pieces of the electromagnet 28, and, because of the magnetic field of the permanent magnet 27, the displacer element 24 will remain in its raised position after the excitation current has been removed. As shown in FIG. 6, the electromagnet 28 is preferably supported in the top wall of enclosure 16 such that it is not contacted by the permanent magnet 27 in the raised position of the displacer element 24. The displacer element 24 in the raised position is illustrated in FIGS. 6 and 7 wherein the displacer element 24 is raised so that the fluid medium 19 flows under this displacer element 24, and the gas pocket or air bubble 26 divides and moves to the sides of the chamber including occupying the space between the rear surface 20 of the prism 17 and the forward surface 25 of the displacer element 24 so as to permit total reflection of the light and a bright output as illustrated in FIG. 7 by the reflected light ray R.

However, a momentary excitation of the electromagnet 28 such that a north pole appears near the north pole N of the bar magnet 27 carried by the displacer element 24 and an electromagnetic south pole appears near the south pole S of the displacer element magnet 27 will cause the displacer element 24 to be repelled and therefore to resume its original position against the bottom of the chamber 21. The fluid medium 19 is then displaced upwardly to a point where the space or gap between the prism surface 20 and the displacer element 24 is again filled by the fluid medium 19 and transmission into the second region reestablished, resulting in a dark display output.

In other words, when the displacer element 24 is in its lowermost position, the level of the fluid rises in the chamber to an extent causing the fluid to contact substantially the entirety of the rear surface of the prism. On the other hand, when the displacer element 24 is pulled up and held in its uppermost position, the fluid level drops. The rear surface of the prism 20 then interfaces with gas, air, or another low refractive index substance used to fill the chamber in combination with the fluid. Thus the displacer element 24 in lowermost position displaces the liquid from the lower portion of the enclosed chamber 21 to a position where it inhibits light reflection.

In accordance with the present invention, the contrast ratio between the conditions of light and dark display is maximized by selecting the fluid medium 19 from a class of transparent, low viscosity liquids having an index of refraction substantially equal to that of the prism material and exhibiting good wetting characteristics in respect of the material of which the prism is comprised. Further, the surface of the displacer element adjacent the window should be as light absorptive as possible. If the liquid has an index of refraction greater than that of the prism material, some internal reflections can take place and, depending upon the reflectivity of the displacer surface adjacent the prism, the aforesaid contrast ratio will be reduced. A highly satisfactory contrast ratio may be realized by making the prism of transparent plastic, of suitable index of refraction, such as Lucite (Trademark of E. I. du Pont de Nemours & Co.). The displacer element may be of various materials with a suitable black surface, for example, black plastic materials such as Bakelite or black loaded polystyrene. The fluid may be water or other liquid of suitable characteristics, such as Brayco 900 Dry Cleaning Solvent DD–680(2) Type I Batch B6LT1 manufactured by the Bray Oil Company of Los Angeles and Richmond, California.

It is further contemplated by the present invention that the fluid media filling the chamber may be two liquids rather than a liquid and a gas such as air. In this case, the fluid replacing the gas should be a transparent liquid having an index of refraction lower than that of the prism and a density substantially different from that of the other liquid so that the two liquids do not mix.

It is within the concept of the present invention to provide that the cells or devices described above can be fabricated such that one-turn electromagnets will suffice for the switching operation and there will be sufficient uniformity to assure reliable operation with normal electrical full signal pulses and no operation with half-amplitude signal pulses. This will make possible coincident current operation wherein a two-dimensional grid is used to link a number of cells and a given cell switched by the application of half-amplitude pulses to the two lines common to the desired cell. This is illustrated by the excitation lines 1, 1' of FIG. 3. Also, it is anticipated that assemblages of cells of the type described herein can be linked by switching lines defining alphanumeric characters and that excitation of a given character line will result in all cells associated with the character to be displayed being turned "ON." In other instances, it is anticipated that all cells in a given assembly would be linked by a common turnoff line so that one signal can be employed to "erase" a complete display.

Figure 8:
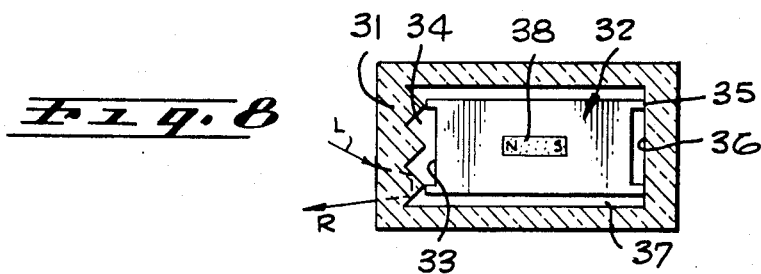
FIG. 8 is a sectional view of another embodiment of the present invention employing a Fresnel-type reflecting surface.

The device or cell described with respect to FIGS. 4 and 5 provides a sharply defined reflecting angle because of the large front-to-back depth of the prism. This situation can be readily improved using a reflecting surface made in the form of a Fresnel lens such as is shown in FIG. 8 represented by numeral 31. In this instance, the individual reflecting surfaces are small and shallow, but the assemblage of reflecting surfaces yields a total reflection with a potentially wide viewing angle. A displacer element 32 is included which provides a flat forward face 33 which is immediately behind the assemblage of reflecting surfaces of the prism so as to define a space or gap 34 which is alternately occupied by a fluid medium or a gas pocket or bubble similar to the fluid medium and gas pocket or bubble arrangement shown with respect to the embodiments of FIGS. 4 and 5. The displacer element 32 includes guide members at their respective corners, such as are represented by numeral 35, which slidably bear against a rearmost wall 36 of a chamber 37 in which the displacer element 32 vertically moves and the rearwardly facing opposite wall of the chamber 37 immediately behind the prism 31. Construction in this fashion permits the displacer element to move vertically with restrictive lateral and longitudinal movement. Bar magnet 38 is carried by the displacer element, and an electromagnet is employed in a similar fashion as previously described.

With respect to the embodiments shown in FIGS. 4 and 8, under some circumstances, such as for ON/OFF indicators, it may be desirable to have a controllable or switchable reflector cell that is bright only when the electromagnet is excited, going dark when the excitation is removed. This can be readily achieved by preventing physical contact of the magnet and the electromagnet so that the residual attracting force is not too strong. When excitation is removed, gravity will then cause the displacer element to drop and thus turn off the cell.

Furthermore, it will be apparent that the device or cell may be made to operate at extremely fast rates if two sets of electromagnets are employed, one above as described earlier and the second electromagnet disposed below the displacer element. Excitation of the two electromagnets would be such as to produce opposite polarities near the displacer magnet. During element switching, one electromagnet would then be attracting and the other repelling so that the magnet would be positively held by one or the other of the electromagnets, making it less likely to change state because of mechanical vibration. Also, it is to be understood that the displacer element may be replaced by magnetic particles suitably suspended in the fluid medium. An electromagnet close to the reflecting surface would then hold the fluid medium against the face, turning the cell "OFF," and a second electromagnet, away from the face, would serve to hold the fluid medium away, thus leaving the cell "ON."

Bistable fluid amplifiers may also be useful in actuating the controllable or switchable light reflecting cell of the present invention. Such an implementation is illustrated in FIG. 9. A cell enclosure 40 is provided having an input port 41 and an output port 42 disposed at opposite ends thereof and further including a lens or prism 43 having a display face 44. A chamber 45 is formed within the cell 40 and is in fluid communication at its opposite ends with the input and output ports so that a pressurized fluid stream may be introduced through the input port 41, flow through the chamber 45, and discharge through the output port 42. Situated within the chamber 45 and extending across the chamber midway between its opposite wall surfaces is a vane 46 shaped in cross section so that a narrow angled end faces the input port 41, while a thickened second opposite end faces the output port 42. The vane 46 divides chamber 45 into discrete passageways 47 which lie between one surface of the vane 46 and the rearmost surface of the prism 43 and a second chamber 48 which lies between the other surface of the vane 46 and the rearmost wall surface of the chamber 45. Therefore, fluid entering at the inlet port 41 can be directed into either passageway 47, where it turns the cell "OFF" by allowing light to be transmitted into the fluid or into passageway 48, leaving the cell highly reflecting and hence "ON." A movable deflector 50 may be rotatably mounted in the inlet port 41 so as to deflect the input fluid medium stream into passageway 47 or the chamber 48. Bernoulli forces maintain the fluid on one side or the other of the vane 46 until a deliberate force is applied to the fluid medium to redirect it. The switching force may take the form of transverse fluid jets near the inlet port 41, if desired, that serve to momentarily deflect the stream, or, alternatively, if the fluid carries magnetic particles, it may be momentarily deflected using appropriately placed electromagnets.

Therefore, it can be seen that the embodiments of the present invention as shown in FIGS. 4, 8, and 9 employ a boundary area between two media wherein light incident on the boundary from the first medium can be either substantially totally reflected or transmitted into the second medium where selection between the states is made through movement of a fluid into or away from the boundary region through the use of deliberately applied control signals or stimuli. Devices or cells may be used individually to display the ON/OFF state of a circuit or condition, or a plurality of cells may be placed together in a mosaic such as for a large display screen for displaying pictorial information or alphanumeric characters.

Another embodiment incorporating the present invention is illustrated in FIG. 10, wherein the light modulating device includes an enclosure 60 having end and sidewalls defining a cavity 61 for holding a quantity of light absorbent or opaque fluid 62 such as india ink, for example. End 63 of the enclosure is composed of light transparent material constituting a transparent window for receiving impinging incident light rays indicated by reference character L and for transmitting reflected or observed light as indicated by reference character R.

A displacer element 64 is movable disposed in the cavity 61 having a reflecting surface 65 carried on its end adjacent the window 63, but spaced therefrom to provide a gap 66. The displacer element is controllably moved between alternate positions within the cavity to displace the fluid into or out of the gap 66. The reflecting surface may take the form of a flat mirror or the form of a multiple wedged dispersive reflector, as illustrated. Means, including an electromagnet 67 and a permanent magnet 68 carried on the element, are employed to control the movement and hence the position of the displacer element.

When the electromagnet 67 is not energized, the displacer element 64 will be forced by gravity to settle into the fluid 62, causing a portion of the fluid to occupy the gap 66. Thus, incident light will be absorbed by the fluid and the visual indication at the window 63 will be dark. However, when the electromagnet 67 is energized, such as is the condition illustrated in FIG. 10, attraction takes place in cooperation with magnet 68, which causes the displacer element 64 to be substantially out of the fluid. In this latter event, the fluid leaves the gap 66, and incident light rays reach the reflecting surface 65 and are reflected outwardly through the window 63 as bright observed light.

Therefore, it can be seen that the light modulating device is controllably switched between alternate conditions of dark and bright visual indications. The gap 66 provides a changeable interface boundary that is readily switched by the electromagnetic control means to provide the desired visual indication.

While particular embodiments of the present invention have been shown and described, it will be obvious to those skilled in the art that changes and modifications may be made without departing from this invention in its broader aspects, and therefore the aim in the appended claims is to cover all such changes and modifications as fall within the true spirit and scope of this invention.

I claim:

1. A reflective light modulating device for switching incident light applied thereto between visually observable states of high light reflection and of light absorption, comprising:
   a hollow housing having one portion thereof formed into a light transparent prism having a predetermined index of refraction;
   a fluid having a predetermined index of refraction substantially equal to or greater than the index of refraction of said prism adapted to substantially occupy the hollow of said housing except for the presence of a gas pocket formed in said fluid having a different index of refraction than said fluid;
   diverter means movably disposed within said housing and being substantially immersed in said fluid; and
   means cooperatively coupled to said diverter means for controllably moving said diverter means so as to selectively alternately locate said fluid and said gas pocket into and out of contact with said prism to modify the visually observable states of the device.

2. The invention as defined in claim 1 wherein said moving means includes a permanent magnet carried by said diverter means and an electromagnet carried on said housing for producing an electromagnetic field sufficient to move said diverter means.

3. The invention as defined in claim 1 wherein said gas pocket constitutes a quantity of air captured within said housing and being substantially buoyant with respect to said fluid.

4. The invention as defined in claim 2 wherein a rear wall of said prism and a forward wall of said diverter means are spaced apart so as to define a gap therebetween constituting a controllable light reflecting boundary adapted to be occupied alternately by said fluid and said gas pocket in response to movement of said diverter means.

5. The invention as defined in claim 2 wherein said prism rear wall takes the form of a wedge lens projecting into the hollow of said housing and said diverter means forward wall is formed in shape to correspond to said wedge lens.

6. The invention as defined in claim 4 wherein said prism rear wall constitutes a Fresnel lens and said diverter means forward wall takes the form of a flat surface.

7. The invention as defined in claim 4 wherein said prism rear wall constitutes a light diffusing and reflecting surface.

8. The invention as defined in claim 4 including guiding means cooperatingly disposed between said diverter means and said housing so as to maintain said gap during movement of said diverter means.

9. The invention as defined in claim 1 wherein said moving means includes electromagnetic means and further includes signal pulsing means coupled to said electromagnetic means adapted to remotely produce signal pulses sufficient to selectively excite said electromagnetic means to move said diverter means in response to the presence of an electromagnetic field.